US010533509B2

(12) United States Patent
Zouboff et al.

(10) Patent No.: US 10,533,509 B2
(45) Date of Patent: Jan. 14, 2020

(54) METHOD FOR PRECISE SYNCHRONIZATION OF A COMBUSTION ENGINE

(71) Applicants: Continental Automotive France, Toulouse (FR); Continental Automotive GmbH, Hannover (DE)

(72) Inventors: Pierre Zouboff, Colomiers (FR); Julien Lefevre, Tournefeuille (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/062,363

(22) PCT Filed: Dec. 12, 2016

(86) PCT No.: PCT/EP2016/002093
§ 371 (c)(1),
(2) Date: Jun. 14, 2018

(87) PCT Pub. No.: WO2017/102073
PCT Pub. Date: Jun. 22, 2017

(65) Prior Publication Data
US 2018/0372010 A1 Dec. 27, 2018

Related U.S. Application Data

(60) Provisional application No. 62/268,934, filed on Dec. 17, 2015.

(30) Foreign Application Priority Data

Jul. 29, 2016 (FR) ..................... 1657374

(51) Int. Cl.
F02D 41/00 (2006.01)
F02D 41/06 (2006.01)
(Continued)

(52) U.S. Cl.
CPC ....... F02D 41/009 (2013.01); F02D 13/0215 (2013.01); F02D 41/062 (2013.01);
(Continued)

(58) Field of Classification Search
CPC ...... F02D 41/009; F02D 41/062; F02D 41/26; F02D 13/0215; F02D 2041/001; F02D 2041/0092; F02D 2400/08; Y02T 10/18
(Continued)

(56) References Cited

U.S. PATENT DOCUMENTS 5,460,134 A 10/1995 Ott et al.
6,640,778 B1 11/2003 Hori
(Continued)

FOREIGN PATENT DOCUMENTS

DE 102014202391 A1 8/2015
DE 102015202207 A1 8/2015
(Continued)

OTHER PUBLICATIONS

International Search Report and Written Opinion for International Application No. PCT/EP2016/002093, dated Mar. 31, 2017, 9 pages.

*Primary Examiner* — Mahmoud Gimie
(74) *Attorney, Agent, or Firm* — RatnerPrestia

(57) ABSTRACT

An exact synchronization method for determining an angular position of an engine, modulo one engine cycle, by a crankshaft sensor and of at least one camshaft sensor. The method includes: estimating a continuous estimated interval assumed to contain the angular position, on receipt of a "marker" event, determining an angular position corresponding to each one of the possible occurrences of this "marker", comparing the determined angular position with the estimated interval. If exactly one of the determined angular positions belongs to the estimated interval, then this angular position is the angular position of the engine. And an engine control method using such a method.

16 Claims, 1 Drawing Sheet

(51) Int. Cl.
*F02D 41/26* (2006.01)
*F02D 13/02* (2006.01)

(52) U.S. Cl.
CPC ........ *F02D 41/26* (2013.01); *F02D 2041/001* (2013.01); *F02D 2041/0092* (2013.01); *F02D 2400/08* (2013.01)

(58) Field of Classification Search
USPC ............. 123/406.58, 406.59, 406.61, 406.62
See application file for complete search history.

(56) References Cited

U.S. PATENT DOCUMENTS

| | | | | |
|---|---|---|---|---|
| 6,895,931 | B2* | 5/2005 | Rupp | F02D 41/009 123/406.18 |
| 2005/0278109 | A1* | 12/2005 | Ando | F02D 41/009 701/112 |
| 2008/0189024 | A1* | 8/2008 | Kondo | F02D 41/009 701/102 |
| 2009/0265079 | A1* | 10/2009 | Kondo | F02D 41/221 701/103 |
| 2013/0090833 | A1 | 4/2013 | Lachaize et al. | |
| 2014/0299080 | A1 | 10/2014 | Zouboff et al. | |
| 2015/0268063 | A1 | 9/2015 | Lapage et al. | |

FOREIGN PATENT DOCUMENTS

| | | |
|---|---|---|
| FR | 2981121 A1 | 4/2013 |
| FR | 3004218 A1 | 10/2014 |
| FR | 3045728 A1 | 6/2017 |
| JP | 2007192091 A | 8/2007 |
| KR | 20140092133 A | 7/2014 |
| KR | 20140127561 A | 11/2014 |
| WO | 9312333 A1 | 6/1993 |
| WO | 2015152866 A1 | 10/2015 |

* cited by examiner

METHOD FOR PRECISE SYNCHRONIZATION OF A COMBUSTION ENGINE

CROSS REFERENCE TO RELATED APPLICATIONS

This application is the U.S. National Phase Application of PCT International Application No. PCT/EP2016/002093, filed Dec. 12, 2016, which claims priority to French Patent Application No. 1657374, filed Jul. 29, 2016 and U.S. Patent Application No. 62/268,934 filed Dec. 17, 2015, the contents of such applications being incorporated by reference herein.

FIELD OF THE INVENTION

The present invention relates to a method for synchronizing an engine. Synchronizing an engine is the operation that consists in determining the angular position of an engine. This determination is essential in order to be able then to control the engine and perform certain operations, such as fuel injection or ignition, at the right moment in the engine cycle.

BACKGROUND OF THE INVENTION

An engine, such as an internal combustion engine, includes a crankshaft sensor and at least one camshaft sensor.

A crankshaft sensor comprises a crankshaft toothed wheel, rotating as one with the crankshaft and comprising a large number of regular teeth and at least one marker. The crankshaft sensor also comprises a crankshaft detector facing said crankshaft toothed wheel and able to detect a presence/absence of material and thus to detect a tooth or a gap.

The crankshaft toothed wheel is equally angularly divided into a large number of regular teeth, thus making it possible to accurately ascertain the angular position of the crankshaft. The crankshaft toothed wheel also comprises at least one marker, allowing a given angular position to be identified in absolute terms. Said marker is generally associated with one position of the engine, such as, conventionally, the top dead center of the first cylinder.

However, for a four-stroke engine, a crankshaft performs exactly two revolutions per engine cycle. Therefore, ascertaining the angular position of a marker indicates the angular position of the crankshaft but is not enough to indicate the angular position of the engine. That position is known with an uncertainty that is dependent on the product that is the number of markers on the crankshaft wheel multiplied by the number of crankshaft revolutions per engine cycle. Thus, with a crankshaft wheel that makes two revolutions per engine cycle and comprises a single marker, the uncertainty is by one marker in two.

At least one camshaft sensor can be used in addition, or as an alternative.

A camshaft sensor comprises a camshaft toothed wheel, rotating as one with a camshaft and comprising a small number of teeth that are advantageously irregular. The camshaft sensor also comprises a camshaft detector facing said camshaft toothed wheel and able to detect a presence/absence of material and thus to detect a tooth or a gap.

A camshaft performs exactly one revolution per engine cycle. The teeth of the camshaft toothed wheel generally display differences in tooth or gap length that allows them to be identified.

This means that, by cross-referencing the information from the crankshaft sensor and from the camshaft sensor(s), it is possible to determine exactly the angular position of the engine, modulo one engine cycle, namely modulo 720° CRK.

It is appropriate to draw a distinction between an exact synchronization method, which produces a precise angular position of the engine, and an estimated synchronization method, that produces an estimated interval assumed to contain the angular position.

Document FR 2 981 121, in the name of the Applicant Company, incorporated by reference herein, discloses an exact synchronization method, that determines an angular position modulo one crankshaft revolution, namely modulo 360°, using the marker present on the crankshaft toothed wheel, and removes any doubt as to which revolution according to the measurements of the angular lengths and/or positions of the teeth as indicated by a camshaft sensor. The principle behind this approach is to make assumptions regarding the angular position of the engine, as soon as a marker is observed, and to invalidate all the assumptions except for a final one progressively as the new events ("start of tooth", "end of tooth"), mainly coming from the camshaft sensor, arise.

The chief disadvantage with this approach is the length of time it takes. This approach entails waiting for a marker which may require half an engine cycle, then receiving and processing events coming from the camshaft sensor until the superfluous assumptions can be eliminated. This approach typically converges toward an angular position of the engine after a rotation through 500° to 720° CRK.

Exact synchronization is needed in order to perform ignition.

Document FR 3 004 218, in the name of the Applicant Company, incorporated by reference herein, discloses an estimated synchronization method, that produces an estimated interval assumed to contain the angular position. That method uses all the events coming both from a crankshaft sensor ("marker") and from at least one camshaft sensor ("start of tooth" and/or "end of tooth") in order to identify at least one camshaft tooth profile as early on as possible. Here, all the available events are put to use, without necessarily waiting for a marker, in order to save time. In order to increase the number of events, several camshaft sensors are advantageously employed. This estimated synchronization method produces an estimated interval, which can be obtained very quickly, typically in under 360° CRK, but which may be discontinuous and/or exhibit a very broad angular span.

Injection, unlike ignition, can be performed as soon as the estimated interval is continuous and exhibits a sufficiently narrow span. Another patent application by the Applicant Company, filed on May 17, 2016, under number FR 1654361, incorporated by reference herein, allows an estimated interval to be rendered continuous.

To date, these two types of method have been used independently. On the one hand, an estimated synchronization method is used to determine the instant at which injection can be performed. On the other hand, an exact synchronization method is used to determine the instant at which ignition can be performed.

If ignition is not performed following injection, the fuel will be discharged, unburnt, in the next exhaust phase. In order to avoid such pollution, it is appropriate for exact synchronization that allows ignition, to be determined shortly after an estimated synchronization, that allows injection, has been determined. The maximum length of time between the availability of estimated synchronization and the availability of exact synchronization is typically of the order of 220° CRK.

SUMMARY OF THE INVENTION

An estimated synchronization method makes it possible to obtain an estimated interval more quickly. So, it is appropriate to propose an exact synchronization method that is improved accordingly so as to be quicker, and thus reduce the distance between the two synchronizations.

The idea behind an aspect of the invention is to combine the two approaches, estimated synchronization and exact synchronization, and to use a continuous estimated interval from an estimated synchronization method to speed up the determining of an angular position using an exact synchronization method.

To this end, an aspect of the invention is an exact synchronization method for determining an angular position of an engine, modulo one engine cycle, by means of a crankshaft sensor comprising a crankshaft detector facing a crankshaft toothed wheel, performing two revolutions per engine cycle, and comprising a large number of regular teeth and at least one marker, the crankshaft detector being able to produce a "tooth" event corresponding to each of said teeth, and a "marker" event for a marker, and at least one camshaft sensor, each camshaft sensor comprising a camshaft detector facing a camshaft toothed wheel, performing one revolution per engine cycle, and comprising a small number of teeth, advantageously irregular, a camshaft detector being able to produce a "start of tooth" event for each rising edge and/or an "end of tooth" event for each falling edge, the method comprising the following steps:

estimating a continuous estimated interval assumed to contain the angular position,
on receipt of a "marker" event, determining an angular position corresponding to each one of the possible occurrences of this marker,
comparing the determined angular positions with the estimated interval:
  if none of the determined angular positions belongs to the estimated interval, or if more than one of the determined angular positions belongs to the estimated interval, then exact synchronization is not achieved,
  if exactly one of the determined angular positions belongs to the estimated interval, then this angular position is the angular position of the engine, and exact synchronization is achieved.

According to another feature, in the comparison step, the estimated interval is replaced by the estimated interval increased by a tolerance margin.

According to another feature, the tolerance margin is equal to a portion of the angular span of a variable-timing device, preferably 75%.

According to another feature, the estimated interval from the estimation step is used in the comparison step only if its span is below a validation threshold.

According to another feature, the method in parallel applies an alternative exact synchronization method, which may prove slower, but has to be convergent.

According to another feature, as long as exact synchronization is not achieved, the method reiterates the estimation and comparison operations.

An aspect of the invention also relates to an engine control method using an estimated synchronization method that produces a continuous estimated interval in order to command an injection of fuel, and such an exact synchronization method to command ignition.

According to another feature, the estimated synchronization method is merged with the estimation step of the exact synchronization method.

According to another feature, injection is permitted only if the span of the continuous estimated interval is below a threshold preferably equal to the validation threshold.

According to another feature, injection is forbidden if the comparison step does not conclude that exact synchronization has been achieved.

BRIEF DESCRIPTION OF THE DRAWINGS

The detailed description is given hereinafter in conjunction with drawings, in which.

Other features, details and advantages of an aspect of the invention will become more clearly apparent from the detailed description provided hereinafter by way of indication.

DETAILED DESCRIPTION OF THE PREFERRED EMBODIMENTS

The crankshaft is the output shaft of an engine. It rotates driven directly by the connecting rod or rods. It performs exactly two revolutions per engine cycle. A camshaft, controlling the valves, is a shaft driven indirectly, via a timing transmission, by the crankshaft, and performs one revolution per engine cycle. An engine cycle is then conventionally referenced according to the angular orientation of the crankshaft over 720°. This then is referred to as degrees crank or ° CRK.

Figure 1:
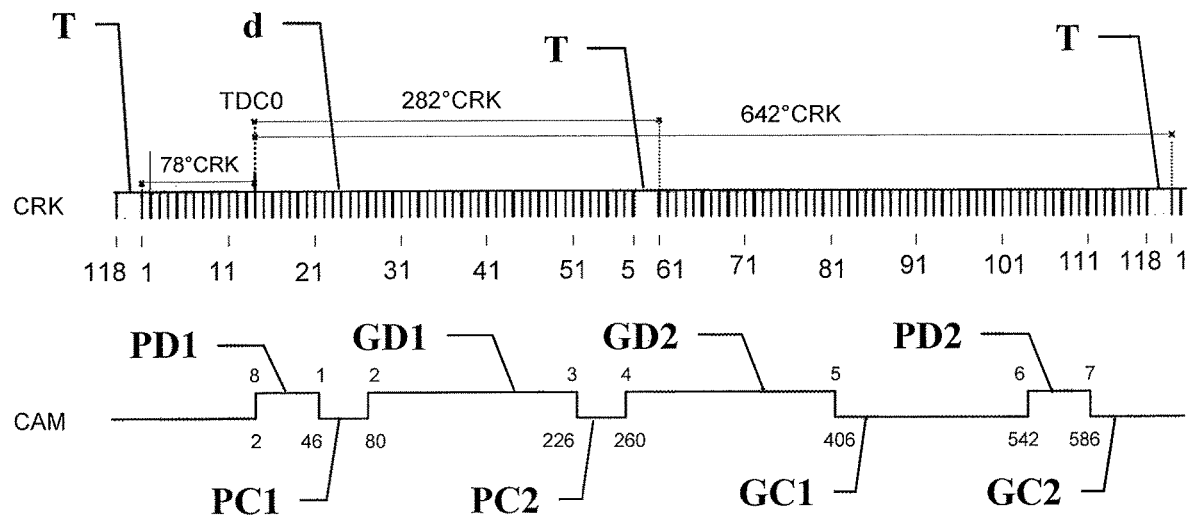
FIG. 1 shows, on a timing diagram, an illustrative crankshaft signal and, against it, an illustrative camshaft signal, over one complete engine cycle.

A crankshaft or CRK sensor makes it possible to know the angular position of the crankshaft. To this end, a crankshaft sensor comprises a crankshaft toothed wheel and a crankshaft detector arranged facing said crankshaft toothed wheel and able to detect a presence/absence of material and thus to detect a tooth or a gap. The crankshaft toothed wheel rotates as one with the crankshaft whereas the crankshaft detector is fixed. The crankshaft toothed wheel comprises a large number of regular teeth, generally equally angularly spaced, and at least one marker. In one conventional embodiment, a single marker enables one particular angular position to be determined in absolute terms for each revolution of the crankshaft. The crankshaft toothed wheel is equally angularly divided into a large number of regular teeth, thus making it possible to accurately ascertain the angular position of the crankshaft, by counting the teeth, in relation to the marker. The marker is generally associated with one position of the engine, such as, conventionally, the top dead center of a cylinder, for example the first cylinder, referenced TDC0 in FIG. 1. The angle between the marker and said TDC0 position of the engine is constant, and known by design. It is, in the example of FIG. 1, equal to 78° CRK.

The crankshaft detector positioned facing the crankshaft toothed wheel is able to detect a presence of material facing a tooth and an absence of material facing a cavity or gap. The crankshaft detector or a processing unit, which is associated and merged with the crankshaft detector for the needs of the present case, is able to produce a "tooth" event d for each of the teeth of the crankshaft toothed wheel. Such a "tooth" event d typically corresponds to an edge for each tooth. Given the large number of teeth present on the crankshaft toothed wheel, a single edge per tooth, out of the rising edge or the falling edge, may be adopted. In a conventional manner, the falling edge is used to form the "tooth" event d.

The crankshaft detector is also able to produce a "marker" event T when it detects a marker.

According to one common but non-mandatory embodiment, the crankshaft toothed wheel is equally angularly divided into 60 regular teeth. Two consecutive teeth are removed so as to form the marker. This leads to a CRK signal, as seen by the crankshaft detector, as illustrated in the upper part of FIG. 1. The CRK signal periodically exhibits a "marker" event T at the 2 missing teeth.

A camshaft sensor or CAM makes it possible to ascertain the angular position of a camshaft. A camshaft, generally synchronously with the crankshaft, performs one revolution per engine cycle. Therefore, ascertaining the angular position of a camshaft provides information regarding the angular position of the engine.

To ascertain the angular position of the camshaft, the camshaft sensor CAM comprises a camshaft toothed wheel and a camshaft detector arranged facing said camshaft toothed wheel and able to detect a presence/absence of material and thus to detect a tooth or a gap. The camshaft toothed wheel rotates as one with the crankshaft, whereas the camshaft detector is fixed. The camshaft toothed wheel comprises a small number of teeth that are advantageously irregular.

This irregularity can be put to use in identifying the teeth and gaps of the camshaft toothed wheel according to the positions of the rising edges and/or of the falling edges and/or to the respective lengths of the teeth and/or gaps, in relation to a known camshaft toothed wheel profile.

A camshaft performs exactly one revolution per engine cycle. Therefore, ascertaining the angular position of a camshaft completely determines the angular position of the engine.

The camshaft detector positioned facing the camshaft toothed wheel is able to detect a presence of material facing a tooth and an absence of material facing a cavity or gap. The camshaft detector or a processing unit, which is associated and merged with the camshaft detector for the needs of the present case, is able to produce a "start of tooth" event and/or an "end of tooth" event for each of the teeth of the camshaft toothed wheel. A "start of tooth" event typically corresponds to a rising edge of a tooth. An "end of tooth" event typically corresponds to a falling edge of a tooth. Given the small number of teeth present on the camshaft toothed wheel, all of the edges, rising and falling, are advantageously adopted. However, in some cases, for example as a result of the shape of the teeth, or of the technology used in the detector, it is not possible to obtain marked events on one of the types of tooth edge. In that case, the method contents itself with using only the "end of tooth" falling edges or the "start of tooth" rising edges.

The use of several camshaft sensors, advantageously angularly offset, makes it possible to multiply the number of events and thus speed up synchronization.

An in-line engine comprises an intake camshaft and an exhaust camshaft. A V-engine comprises two intake camshafts and two exhaust camshafts. If each camshaft comprises a sensor CAM, it is possible to have two or even four CAM signals.

By correlating at least one CAM signal, coming from a camshaft sensor, with a CRK signal coming from a crankshaft sensor, it is possible, by eliminating time, to graduate a camshaft signal in terms of angle rather than in terms of time.

It should be noted here that the angles used are, by convention, referenced in relation to an engine cycle, i.e. modulo 720°. They are therefore double the effective angles of rotation for the camshaft or its toothed wheel. Thus, for example, when it is written that a small tooth PD1, PD2 has an angular length/span of 44°, a small tooth effectively occupies, on the camshaft toothed wheel, an angular sector of 22°.

Equipped with such an angular graduation, it is possible, by comparing the angular lengths of the teeth, the angular lengths of the cavities, the angular distance between a preceding "marker" event T and the first tooth or the first cavity, and/or the angular distance between the last tooth or the last cavity and a following "marker" event T, with a known camshaft toothed wheel profile, to determine, using any shape-recognition method, the angular position of the camshaft toothed wheel.

According to one possible embodiment, the camshaft toothed wheel comprises four irregular teeth and, separating them, four cavities that are also irregular, i.e. a first small tooth PD1, followed by a first small cavity PC1, followed by a first large tooth GD1, followed by a second small cavity PC2, followed by a second large tooth GD2, followed by a first large cavity GC1, followed by a second small tooth PD2, followed by a second large cavity GC2. The small teeth PD1, PD2 have an angular length/span of 44°, the small cavities PC1, PC2 have an angular length/span of 34°, the large teeth GD1, GD2 have an angular length/span of 146°, and the large cavities GC1, GC2 have an angular length/span of 136°. The camshaft toothed wheel corresponds to a total span (for one revolution) of 720°. The start or rising edge of the first small tooth PD1 is situated in this case 76° after a "marker" event T of the crankshaft toothed wheel, but this angular distance may vary according to the timing setting. This produces a CAM signal as illustrated in the lower part of FIG. 1.

Any event may be marred by a possible error as to its angular value. Such an error, attributable to mechanical and/or electrical causes, is estimated at a value of +/−20°. This error needs to be taken into consideration in any synchronization method when identifying an event.

The timing setting or angular phasing, which has an influence on the angular distances between a crankshaft event ("tooth", "marker") and a camshaft event ("start of tooth", "end of tooth"), or even between two camshaft events, whether these come from the one same camshaft at different times or from two different camshafts, is disturbed by the presence of a variable valve timing (VVT) device. Such a device, which may be present on each camshaft, introduces variable angular phasing. In addition, the magnitude of this phasing is also unknown at the time that synchronization is being performed. The magnitude of this phasing may typically vary between 0° and 55° CRK in the case of an intake camshaft and between −55° and 0° CRK in the case of an exhaust camshaft.

Both this error and this phasing need to be taken into account, by means of a tolerance, when considering the angular position of an event in order to perform synchronization by identifying at least one event.

An aspect of the invention relates to an exact synchronization method. Such a method determines an angular position of an engine, modulo one engine cycle. This is achieved by means of a crankshaft sensor CRK comprising a crankshaft detector facing a crankshaft toothed wheel, performing two revolutions per engine cycle, and comprising a large number of regular teeth and at least one marker, the crankshaft detector being able to produce a "tooth" event d corresponding to each of said teeth and a "marker" event T for a marker, and of at least one camshaft sensor CAM, each camshaft sensor CAM comprising a camshaft detector facing a camshaft toothed wheel, performing one revolution per engine cycle, and comprising a small number of teeth, advantageously irregular, a camshaft detector being able to produce a "start of tooth" event for each rising edge and/or an "end of tooth" event for each falling edge.

A first particular feature of an aspect of the invention is that it places itself at the moment that a "marker" event is received, namely at the moment of the first such "marker" event.

In the phase of determining synchronization, the angular position of a crankshaft event as seen by a sensor CRK, relative to the angular position of the engine, is marred only by the imprecision attributable to mechanical and/or electrical causes. By contrast, the angular position of a camshaft event, as seen by a sensor CAM, relative to the angular position of the engine, because of the possible presence of a variable valve timing or VVT device, the angular position of which cannot yet be known in this phase, is marred by the same imprecision attributable to mechanical and/or electrical causes plus the, markedly greater, maximum angular amplitude of the variable valve timing device. It then follows that the angular position of a crankshaft event is markedly more precise. Hence, this allows more precise determination of an angular position of the engine.

The disadvantage of a crankshaft event, such as a "marker" event, is that it occurs several times during the course of one engine cycle. A crankshaft toothed wheel performs an exact number of revolutions, typically two, per engine cycle. A crankshaft toothed wheel comprises a number of markers, typically one, per revolution of the wheel. A "marker" event therefore has a number of occurrences that is equal to the product formed by multiplying the exact number of revolutions by the number of markers, namely typically two. A crankshaft toothed wheel performing two revolutions per engine cycle and comprising three markers per revolution would produce six occurrences.

Thus, each "marker" event can be associated and determine one possible angular position of the engine. The result of this is a number of possible angular positions that is equal to the number of occurrences, namely a lack of determinacy equal to the number of occurrences.

So, when the first "marker" event is detected, the angular position of the engine is known precisely, but out of a number of angular positions equal to the number of occurrences.

A second particular feature of an aspect of the invention consists, in order to eliminate the indeterminacy, in using a continuous estimated interval IP assumed to contain the angular position of the engine. Such a continuous interval IP is typically produced during an estimation step.

Such an estimation step is performed for example according to the method described in document FR 3 004 218. However, it is necessary, for the purposes of the present invention, for said estimated interval IP to be continuous. In order to guarantee this continuity, all methods are possible. According to a first method, the method according to document FR 3 004 218 is continued, waiting for and processing other events, until such time as its result is a continuous interval. According to a second method, described in the application by the Applicant Company, filed on May 17, 2016, under number FR 1654361, incorporated by reference herein, said interval IP is "forced" to be continuous. The principle behind this method is to extend the union of all the sub-intervals possibly containing the angular position of the engine in such a way as to form the smallest possible continuous interval that contains all these sub-intervals.

The method then continues by comparing the various possible angular positions with the continuous estimated interval IP.

Figure 2:
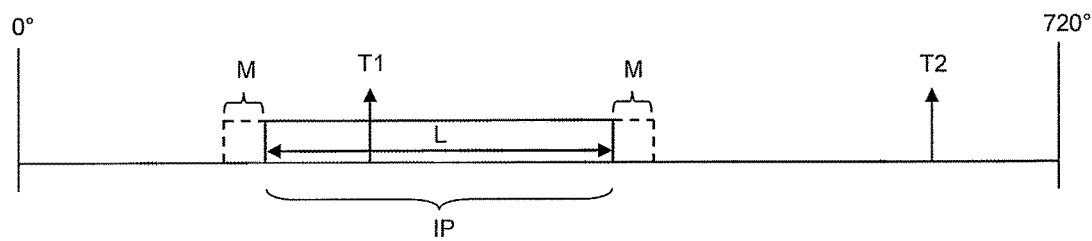
FIGS. 2 to 4 show, on a timing diagram covering one engine cycle, the three scenarios encountered during a comparison.
Figure 3:
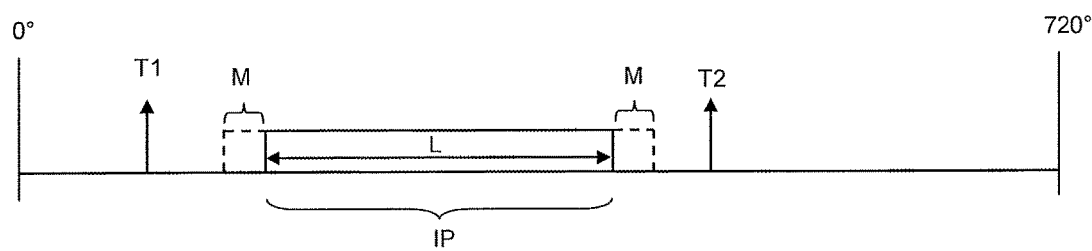
Figure 4:
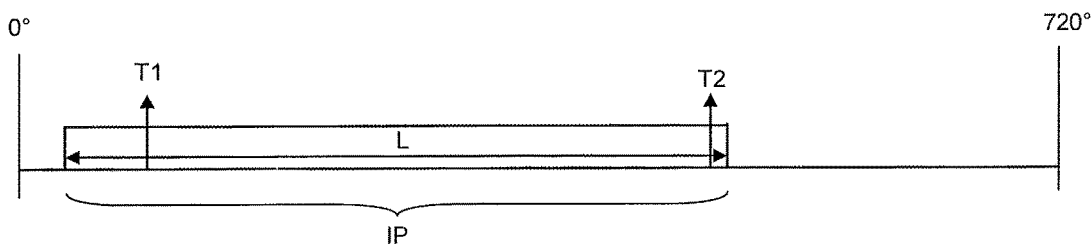

This comparison step is illustrated in FIGS. 2 to 4, which show a timing diagram covering one engine cycle. Depicted here is an estimated interval IP, of span L. It is assumed that the marker makes two appearances per engine cycle. The method encounters a first marker. It therefore determines as many possible angular positions T1, T2 as there are occurrences.

According to a first embodiment, there are two scenarios considered.

In a first scenario, illustrated in FIG. 2, if exactly one of the determined angular positions T1, T2 belongs to the estimated interval IP, in this case the position T1, then this angular position T1 is deemed to be the angular position of the engine. In this case, the estimated interval IP makes it possible to remove the indeterminacy, keeping just one angular position T1. This angular position T1 is known with precision. Exact synchronization is achieved and the method is finished.

The advantage of the method in terms of speed may be appreciated here. Specifically, in this favorable case, exact synchronization is achieved as soon as the first "marker" event is received, i.e. very quickly. With a typical crankshaft wheel performing two revolutions and comprising one marker per revolution, such an event occurs on average at 180° CRK, namely at one quarter of an engine cycle, and at the latest, at 360° CRK, namely at one half of an engine cycle. At least the aforementioned estimated synchronization method that "forces" continuity makes it possible to determine a continuous estimated interval IP in a mean time of under 300° CRK, i.e. in a time compatible with the time taken for the "marker" event to appear. This allows exact synchronization to be achieved at 360° CRK, at the latest.

According to a second scenario, if, on the other hand, none of the determined angular positions T1, T2 belongs to the estimated interval IP, as illustrated in FIG. 3, or if more than one, and in this instance both, of the determined angular positions T1, T2 belong to the estimated interval IP, as illustrated in FIG. 4, the indeterminacy cannot be resolved. Exact synchronization is not achieved and the method needs advantageously to continue.

It is appropriate to make a distinction between the two above conditions. If, as in FIG. 4, more than one of the determined angular positions T1, T2 belongs to the estimated interval IP, it is probable that the estimate is not precise enough insofar as the span L of the estimated interval IP is too great. This may probably be improved by continuing the estimated synchronization method used for the estimating.

If, on the other hand, as in FIG. 3, none of the determined angular positions belongs to the estimated interval IP, then it may be considered that the estimate is erroneous. So, the validity of the estimated interval IP becomes questionable. Likewise, the operations performed on the basis of this estimated interval IP need to be stopped and/or corrected.

According to a second embodiment, a tolerance margin M, featured in dotted line at the endpoints of the interval IP in FIGS. 2 and 3, is added to the estimated interval IP which is then replaced by the estimated interval IP increased by said tolerance margin M. The comparison is performed in a similar way, drawing the same conclusions.

The addition of this tolerance margin M, around the estimated interval IP, seeks to take account of the unknown that is the angular timing setting of the variable valve timing device or VVT. This is because this angular timing setting may have an influence on a camshaft event and thus may have modified the estimated interval IP, the determination of which is generally based on one or more camshaft events. So, this tolerance margin M is advantageously equal to a portion of the angular span of a variable-timing device. A preferential value of 75% of the angular span has yielded good results. Thus, for example, for a variable-timing device exhibiting an angular span of 55° CRK, a tolerance margin M of 40° CRK may be applied.

The first iterations of the estimated synchronization method used during the estimation step may, because of the low number of events still available, produce an estimated interval IP that is difficult to exploit. There are two types of defects that may be encountered here: the estimated interval IP is discontinuous in as much as it is formed of several non-contiguous segments and/or has too great a span L. The continuity defect can be corrected using at least two methods, as indicated hereinabove. So, it is considered that the estimated interval IP available as input for the method according to an aspect of the invention is continuous. The defect whereby the span is too great can be illustrated thus: If the span L of the estimated interval IP exceeds the distance between two occurrences of a marker (namely 360° CRK in the case of a crankshaft toothed wheel comprising a single marker), there is a risk that the interval IP will be unable to make it possible to lift the indeterminacy insofar as it may contain two occurrences of the angular position. So, in order to make the synchronization method more robust, the comparison step may comprise an earlier test step in which the span L of the estimated interval IP is tested against a threshold referred to as the validation threshold. The estimated interval IP is used for making a comparison only if its span L is below the validation threshold. When its span L is above said validation threshold, an estimated interval IP is considered to provide too little information to be able to lift the indeterminacy.

It is necessary for the exact synchronization method to arrive, ultimately, at an exact determination of the angular position of the engine. The present method makes it possible to achieve this result very quickly, but not with great certainty. So, the synchronization method advantageously applies, in parallel with the steps described hereinabove, another, alternative, exact synchronization method. This alternative method may perhaps be slower, but has to converge toward an exact angular position value. Such an alternative method may, for example, be that of FR 2 981 121. Such a method has to converge, at the very latest in one engine cycle, namely after 720° CRK.

According to another, advantageously complementary, feature, as long as exact synchronization has not been achieved, either because the estimated interval IP does not allow the indeterminacy to be removed, or because the potential alternative method has not yet achieved synchronization, the method according to an aspect of the invention may reiterate the estimation and comparison operations. Thus, a new estimation step, because of the possible new events that have occurred since an earlier estimation, has good chances of producing a new estimated interval IP that is more precise (has a shorter span L), thus increasing the chances of a further comparison step reaching a positive conclusion and achieving exact synchronization.

The synchronization method according to an aspect of the invention may advantageously be used, potentially in collaboration with one or more synchronization methods according to the prior art, within an engine control method.

Such an engine control method advantageously uses an estimated synchronization method to produce a continuous estimated interval IP. This estimated interval IP may be used as an estimated angular position of the engine in order to determine an angular position at which it is possible to make an injection of fuel. This is because this operation tolerates, with regard to the angular position of the engine, an imprecision which may be great and be as much as one or several hundred degrees CRK.

Such an engine control method still advantageously uses an exact synchronization method as described hereinabove according to an aspect of the invention to command ignition, as that operation requires an exact angular position of the engine.

Such a combination is advantageous insofar as the estimated synchronization is usually available before the exact synchronization, which is consistent with the order of operations in which injection precedes ignition.

This combination is even more advantageous insofar as the estimated synchronization method coincides with the estimation step of the exact synchronization method and thus allows the estimated interval IP already obtained to be reused.

An injection may advantageously be performed as soon as the span L of the estimated interval IP is below a precision threshold advantageously equal to said imprecision. The imprecision here is connected with the duration of an intake phase and with the duration for which an intake valve is open. This generation may typically reach a value of from 130° to 160° CRK. So, as soon as an estimated interval IP is determined with a precision better than this angular duration, an injection may be made.

According to one possible embodiment, the precision threshold is advantageously taken as being equal to the validation threshold.

The criterion for acceptance of the estimated interval IP on the basis of its span L is thus the same when the interval IP is used to perform an injection and when the estimated interval IP is used to speed up exact synchronization. Such a feature contributes to connecting the two uses of the estimated interval IP and thus contributes to reducing the time between the moment at which an estimated synchronization is available and the moment at which an exact synchronization is available.

The combination, which is performed within an engine control method, also benefits from information derived from the comparison step. When the comparison step is unable to reach a positive conclusion, it is considered that the estimated interval IP is incorrectly positioned and does not contain the angular position of the engine. Accordingly, the method advantageously prevents any injection as soon as and as long as this condition is satisfied. It has been seen that this condition may correspond to one of two scenarios.

In the case where more than one of the angular positions belongs to the estimated interval IP, it is probable that said estimated interval IP has a span L greater than the precision threshold. So, it is probable that no injection has yet been authorized.

In the case where no angular position belongs to the estimated interval IP, it is possible that the estimated interval IP has a span L shorter than the precision threshold and that an injection has already taken place. Bearing in mind the error observed on the estimated interval IP, it is probable that exact synchronization is not going to be able to be achieved rapidly or, at the very least, that it is going to be delayed, thus leading detrimentally to unburnt fuel in the exhaust. So, as soon as the comparison step reaches a negative conclusion, it is preferable to prevent any future injection, even in cases in which such an injection had already been authorized and/or performed. This prevention is lifted as soon as exact synchronization is achieved.

It is possible, under certain conditions, for the estimation step to be incapable of determining a continuous estimated interval IP. In this case, the exact synchronization method cannot use same to speed up the determination of the angular position of the engine. However, in such a case, the absence of an estimated interval IP prevents any injection. So, speeded-up exact synchronization according to an aspect of the invention is not absolutely essential insofar as the risk of unburnt fuel does not exist. "Slow" exact synchronization, typically obtained by the alternative exact synchronization method, allows both injection and ignition to take place.

The invention claimed is:

1. An exact synchronization method for determining an angular position of an engine, modulo one engine cycle, by a crankshaft sensor comprising a crankshaft detector facing a crankshaft toothed wheel, performing two revolutions per engine cycle, and comprising a large number of regular teeth and at least one marker, the crankshaft detector being able to produce a "tooth" event corresponding to each of said teeth, and a "marker" event for a marker, and at least one camshaft sensor, each camshaft sensor comprising a camshaft detector facing a camshaft toothed wheel, performing one revolution per engine cycle, and comprising a small number of teeth, advantageously irregular, a camshaft detector being able to produce a "start of tooth" event for each rising edge and/or an "end of tooth" event for each falling edge, the method comprising:

estimating a continuous estimated interval assumed to contain the angular position, on receipt of a "marker" event, determining an angular position corresponding to each one of the possible occurrences of this marker, and comparing the determined angular positions with the estimated interval:

if none of the determined angular positions belongs to the estimated interval, or if more than one of the determined angular positions belongs to the estimated interval, then exact synchronization is not achieved, if exactly one of the determined angular positions belongs to the estimated interval (IP), then this angular position is the angular position of the engine, and exact synchronization is achieved.

2. The method as claimed in claim 1, wherein, in the comparison step, the estimated interval is replaced by the estimated interval increased by a tolerance margin.

3. The method as claimed in claim 2, wherein the tolerance margin is equal to a portion of an angular span of a variable-timing device.

4. The method as claimed in claim 1, wherein the estimated interval from the estimation step is used in the comparison step only if its span is below a validation threshold.

5. The method as claimed in claim 1, applying, in parallel, an alternative exact synchronization method, which may prove slower, but has to be convergent.

6. The method as claimed in claim 1, wherein as long as exact synchronization is not achieved, the method reiterates the estimation and comparison operations.

7. An engine control method, wherein the method uses an estimated synchronization method that produces a continuous estimated interval in order to command an injection of fuel, and an exact synchronization method as claimed in claim 1 to command ignition.

8. The method as claimed in claim 7, wherein the estimated synchronization method is merged with the estimation step of the exact synchronization method.

9. The method as claimed in claim 7, wherein injection is permitted only if the span of the continuous estimated interval is below a threshold.

10. The method as claimed in claim 7, wherein injection is forbidden if the comparison step does not conclude that exact synchronization has been achieved.

11. The method as claimed in claim 3, wherein the portion of the angular span is 75%.

12. The method as claimed in claim 8, wherein injection is permitted only if the span of the continuous estimated interval is below a threshold.

13. The method as claimed in claim 8, wherein injection is forbidden if the comparison step does not conclude that exact synchronization has been achieved.

14. The method as claimed in claim 9, wherein injection is forbidden if the comparison step does not conclude that exact synchronization has been achieved.

15. The method as claimed in claim 7, wherein injection is permitted only if the span of the continuous estimated interval is equal to the validation threshold.

16. The method as claimed in claim 8, wherein injection is permitted only if the span of the continuous estimated interval is equal to the validation threshold.

* * * * *